(12) United States Patent
Lloyd et al.

(10) Patent No.: US 6,930,638 B2
(45) Date of Patent: Aug. 16, 2005

(54) PASSIVE MOVING OBJECT DETECTION SYSTEM AND METHOD USING SIGNALS TRANSMITTED BY A MOBILE TELEPHONE STATION

(75) Inventors: Peter Gregory Lloyd, Salisbury (GB); Gareth Liam Harris, Southampton (GB); Brian Phillip Stothard, Winchester (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 10/485,371

(22) PCT Filed: Jul. 25, 2002

(86) PCT No.: PCT/EP02/08334

§ 371 (c)(1),
(2), (4) Date: Aug. 4, 2004

(87) PCT Pub. No.: WO03/012473

PCT Pub. Date: Feb. 13, 2003

(65) Prior Publication Data

US 2004/0246177 A1 Dec. 9, 2004

(30) Foreign Application Priority Data

Aug. 1, 2001 (GB) .............................................. 0118707
Feb. 4, 2002 (GB) .............................................. 0202412

(51) Int. Cl.$^7$ .............................................. G01S 3/02
(52) U.S. Cl. ....................... 342/453; 342/450; 342/458; 342/461

(58) Field of Search ................................. 342/450, 453, 342/456, 457, 458, 461, 463

(56) References Cited

U.S. PATENT DOCUMENTS

| 3,943,514 A | * | 3/1976 | Afendykiw et al. ........ 342/156 |
| 5,604,503 A | | 2/1997 | Fowler et al. |
| 6,011,515 A | | 1/2000 | Radcliffe et al. |
| 6,232,922 B1 | | 5/2001 | McIntosh |
| 6,243,587 B1 | * | 6/2001 | Dent et al. ................ 455/456.2 |
| 6,549,165 B2 | * | 4/2003 | Neira et al. .................. 342/462 |
| 6,580,392 B2 | * | 6/2003 | Yu .............................. 342/378 |

FOREIGN PATENT DOCUMENTS

| WO | WO 01/22117 A | 3/2001 |
| WO | WO 02/35252 A2 | 5/2002 |

* cited by examiner

*Primary Examiner*—Dao Phan
(74) *Attorney, Agent, or Firm*—Crowell & Moring LLP

(57) ABSTRACT

A passive object detection system (1) comprises first and second antennas (4, 6) and a processor (8). The first antenna (4) is adapted to receive a signal transmitted by a mobile telephone base station; the second antenna (6) is adapted to receive the signal transmitted by a mobile telephone base station (2) after it has been reflected off an object (3) and the processor compares the signal received from the mobile telephone base station with the signal reflected from the object to derive speed or position information relating to the object therefrom.

4 Claims, 4 Drawing Sheets

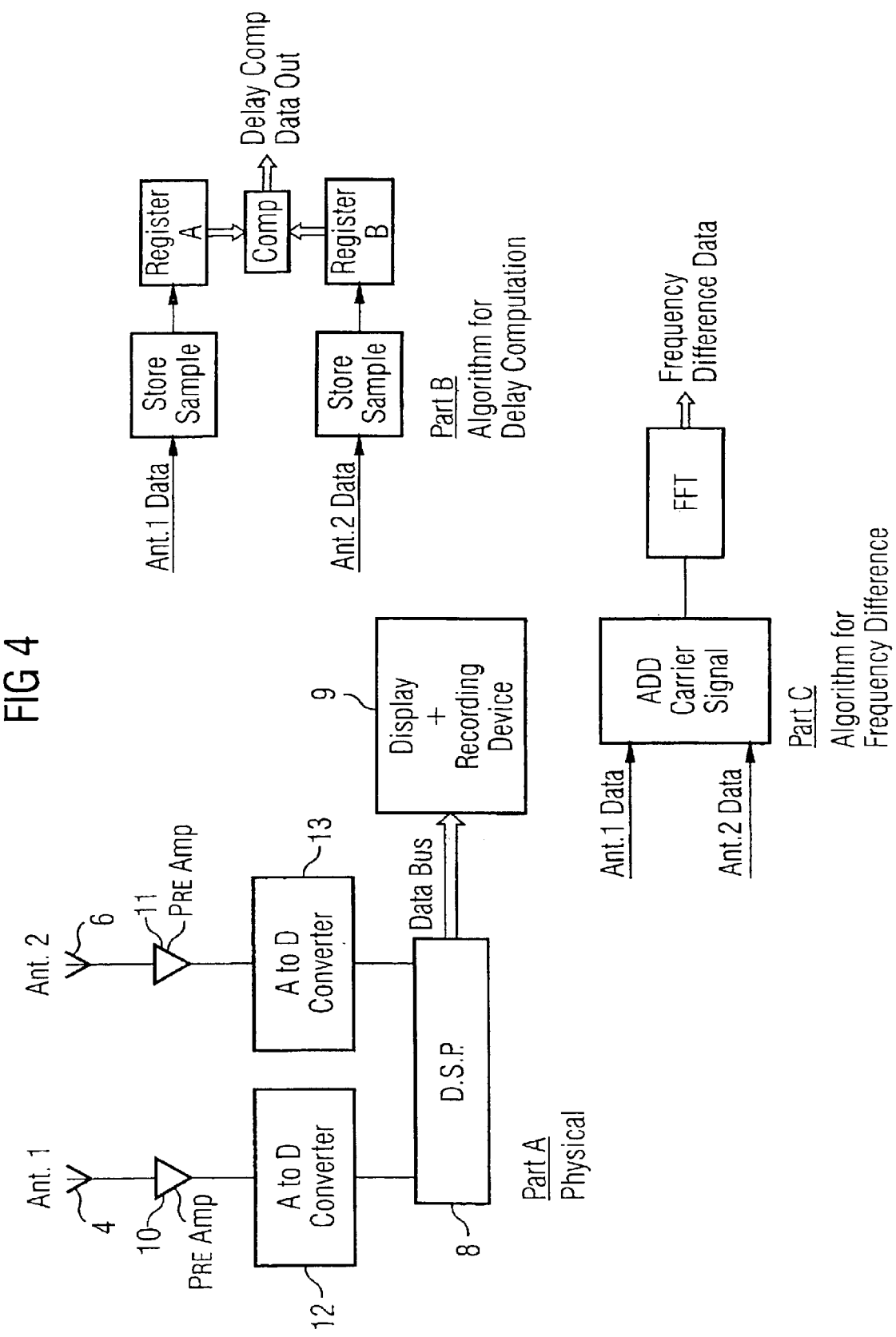

PASSIVE MOVING OBJECT DETECTION SYSTEM AND METHOD USING SIGNALS TRANSMITTED BY A MOBILE TELEPHONE STATION

This invention relates to a system and method for object detection, in particular for detecting moving objects.

There are many situations in which it is desirable to detect moving objects and to provide position and/or speed information about those objects, for example, to detect aircraft, monitor traffic flow or to detect vehicles exceeding the speed limit. Active radar systems are often used for these purposes, however this requires RF transmissions. Use of RF transmissions has some disadvantages. The transmissions can be detected by simple receivers, which gives away the presence of the sensor (e.g. car radar detectors used by speeding motorists). Also, there are many legal restrictions on the transmission of radio frequencies, which may differ from one country to another, so a system suitable for use in one country may be illegal in another.

Passive systems using television transmitters have been proposed, however these have certain disadvantages. Although they use high power transmitters, the objects being detected are often far away and the received signal power may be weak.

U.S. Pat. No. 5,604,503 describes a method of separating multipath signals received at an antenna using a signal preprocessor which permits coherent bistatic radar detection with a single omnidirectional antenna.

U.S. Pat. No. 6,011,515 describes a vehicle traffic sensor using a roadside antenna to detect signals from a transmitter and signals reflected off a vehicle.

In accordance with a first aspect of the present invention, a passive method of detecting an object comprises receiving a first signal transmitted by a mobile phone base station, receiving a second signal comprising the first signal transmitted by the mobile phone base station after it has been reflected off an object; and comparing the first and second signals to derive data relating to position or speed of movement of the object; the method further comprising providing a plurality of mobile phone base stations which transmit a signal, such that as the object moves out of range of one base station, it comes into range for another, whereby the distance of the object from a base station being used to determine a position of the object remains substantially constant and the distance of the object from the receiver changes, thereby improving the received power and range.

In accordance with a second aspect of the present invention a passive object detection system comprises first and second antennas; and processing means; wherein the first antenna is adapted to receive a signal transmitted by a mobile telephone base station; wherein the second antenna is adapted to receive the signal transmitted by the mobile telephone base station after the signal has been reflected off an object and wherein the processing means compares the signal received from the mobile telephone base station with the signal reflected from the object and derives speed or position information relating to the object therefrom; wherein the object is a moving object; and the system further comprises a plurality of mobile phone base stations which transmit a signal, such that as the object moves out of range of one base station, it comes into range for another, whereby the distance of the object from a base station being used to determine a position of the object remains substantially constant and the distance of the object from the receiver changes, thereby improving the received power and range.

The present invention covers a passive electronic system which makes use of the radio emissions from mobile phone base stations and in particular the reflection of those radio waves from objects, such as cars, people and animals, to detect the location and, if moving, the velocities of those objects. No transmissions from the system are required and the detection system can be carried from place to place and used in conjunction with an existing mobile phone base station nearby. It is particularly beneficial to police forces enforcing speed limits, that the vehicle cannot detect the existence of the sensor. The proliferation of mobile phone bases stations in towns and on main roads gives good coverage, in the areas required.

An example of a passive object detection system and method according to the present invention will now be described with reference to the accompanying drawings in which:

FIG. 4 illustrates a sensor of the system of FIG. 2 in more detail;

Figure 1:
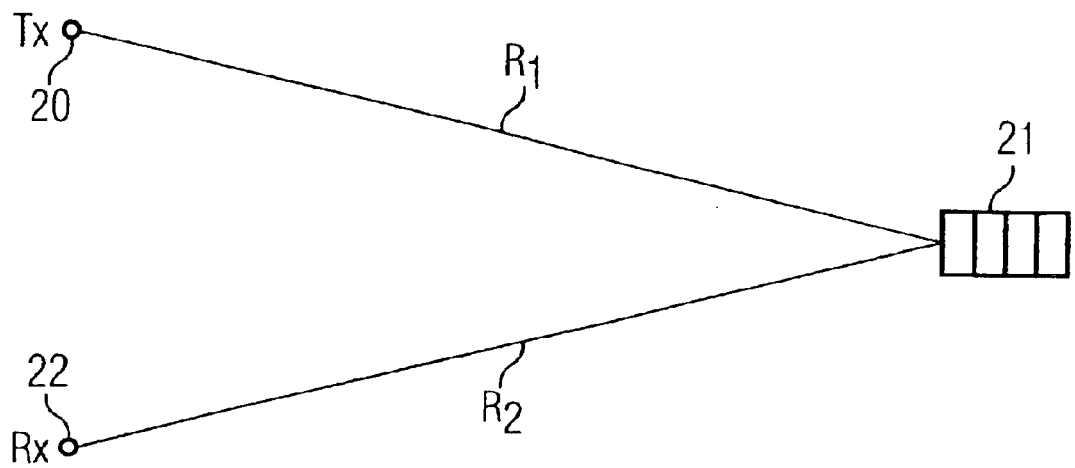
FIG. 1 is a plan view of a prior art system.

FIG. 1 shows in plan view how a prior art system for detecting objects, in this case using a television transmitter, operates. A tv transmitter 20 emits a signal which travels a distance $R_1$ and is reflected off an object 21. The reflected signal travels a distance $R_2$ and is received at a receiver 22. The power $P_R$ of the signal received at the receiver 22 can be calculated from the equation:

$$P_R = \frac{P_T G_1 G_2 \sigma}{(4\pi)^3 R_1^2 R_2^2} \lambda^2$$

where $P_T$ is is the transmitted power $G_1$ is the gain of the first antenna $G_2$ is the gain of the second antenna $\sigma$ is the radar cross section of the object of interest $\lambda$ is the wavelength of the transmitted signal $R_1$ is the distance between the transmitter and the object $R_2$ is the distance between the receiver and the object In the prior art system using a tv transmitter, when the object is moving away from the transmitter the distances $R_1$ and $R_2$ increase at a similar rate, so one can assume that the received power $P_R$ is proportional to $1/R^4$, i.e. as the object moves away there is a fast and significant reduction in received power.

Figure 2:
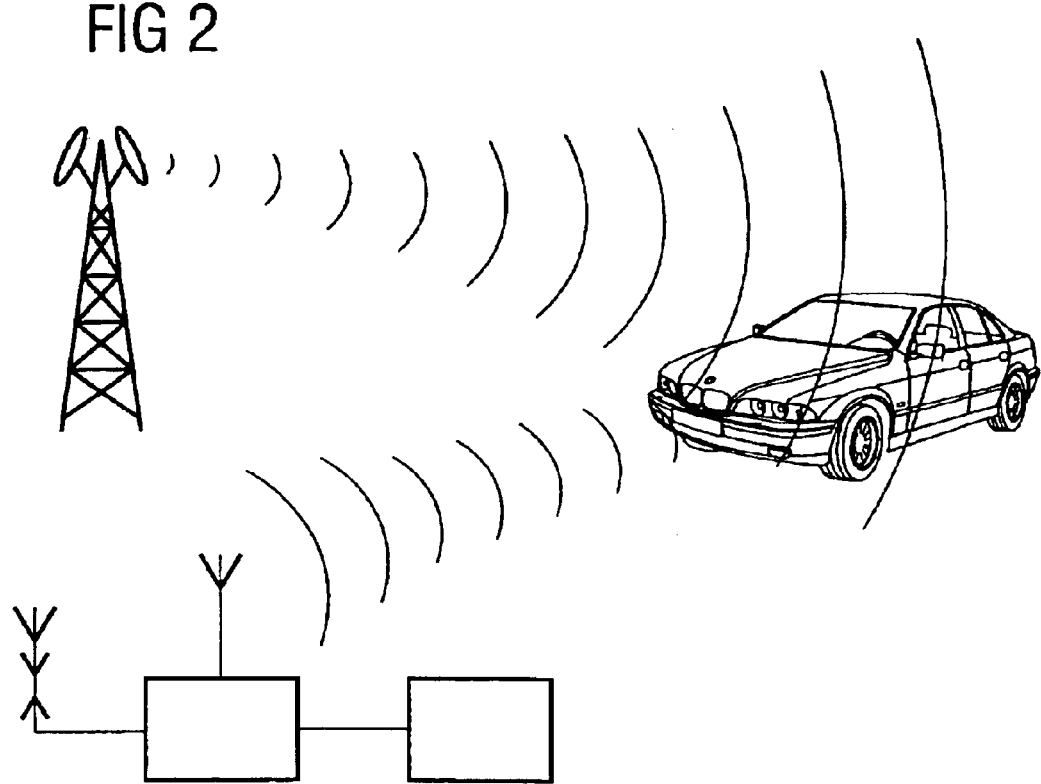
FIG. 2 is a schematic diagram of one example of a passive object detection system according to the invention.

FIG. 2 illustrates how a passive object detection system 1 according to the present invention is used in conjunction with radio waves transmitted by a mobile phone base station 2 and reflected off an object 3. In this example, the object in question is a vehicle, but other objects could be sensed equally well. The object may be moving or stationary. The system comprises a first antenna 4 which points directly at the base station 2 and detects radio waves 5 which have travelled along the shortest path. A second antenna 6 points in the direction of the object of interest and detects radio waves 7 reflected off that object 3. The antennas may be of any suitable type, such as Yagi or phased arrays. A processor 8 analyses the signals received by the first and second antennas 4, 6 and compares the phase and frequencies of these two received signals. This is illustrated in more detail in FIG. 4. The processor also measures the time delay between the two received signals. The signals may then be displayed or stored.

A display device 9 takes the output of the processor and displays the information derived about frequency difference and time delay between the two signals. The display may convert the information into distance off and speed of the object, if it is moving. A recording mechanism may also be provided. Such a system would be particularly useful in monitoring traffic flow.

Figure 3:
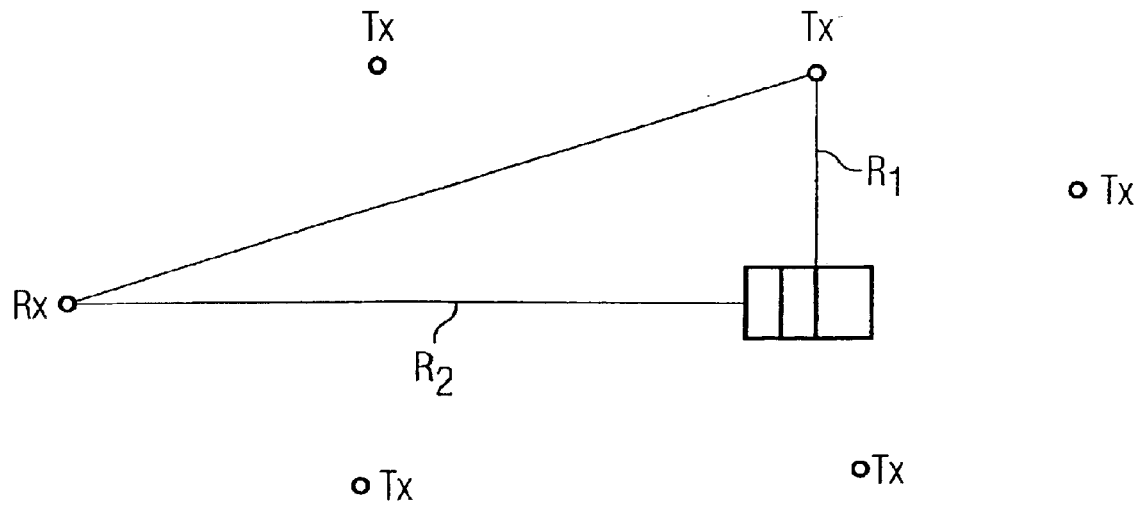
FIG. 3 is a plan view illustrating operation of the system of FIG. 2
Figure 5:
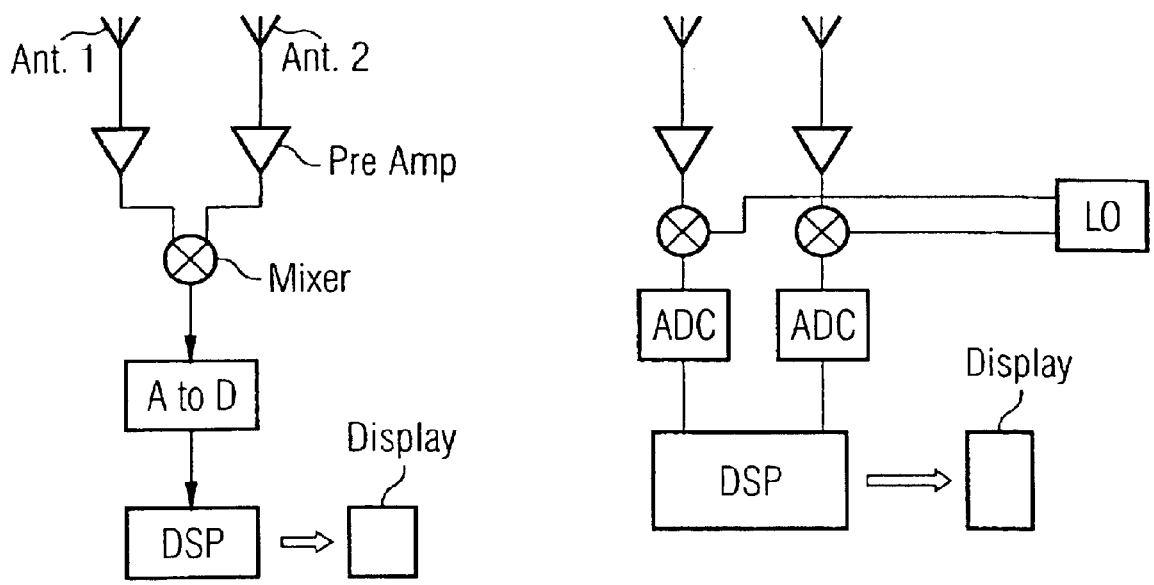
FIG. 5 illustrates alternative arrangements for the sensor of FIG. 2.

The advantages of the present invention can be seen from FIG. 3 which is a plan view of the system in operation. As in the prior art, there is a receiver 22, however the present invention does not rely on a single transmitter. Instead, it takes advantage of the proliferation of mobile phone transmitter aerials 23. This has the effect that instead of the object moving out of range of the transmitter and so increasing the distance $R_1$, when the object moves out of range of one transmitter, it comes into range for another, so that the distance $R_1$ remains subtantially constant whilst $R_2$ changes. From this, $P_R$ can be taken to be proportional to $1/R^2$, thereby significantly increasing the received power. By using transmitters further away from the receiver, the range of the device is increased over prior art systems because the target is always close to a transmitter, despite mobile phone transmitters operating at higher frequency and lower power than tv transmitters.

FIG. 4 illustrates the signal processing in more detail. The signal received by each antenna 4, 6 is amplified in respective pre-amplifiers 10, 11, then converted to a digital signal by analogue to digital converters (ADC's) 12, 13. In practice the received signals would probably be mixed down to a lower frequency before being sampled by the ADC, for example as shown in FIG. 3.

Figure 6:
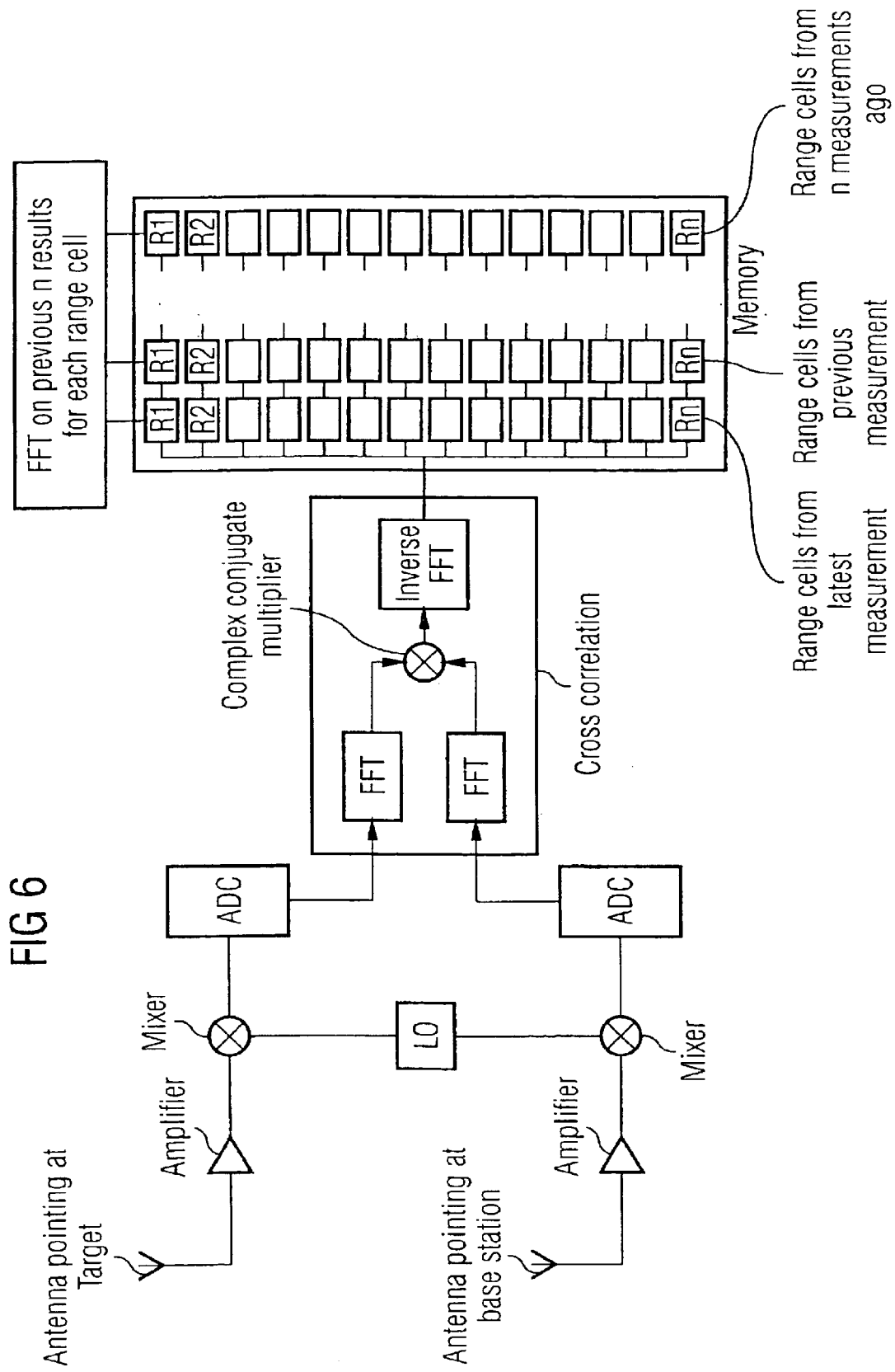
FIG. 6 is a flow diagram illustrating an algorithm for use in the system of FIG. 2.

The output signals from the ADC's 12, 13 are fed into the processor 8, which may be a digital signal processor or some hardware implementation of the algorithm such as an FPGA, EPLD, ASIC or similar. The processor is set up to run an algorithm as illustrated in the flow diagram of FIG. 6. This algorithm has two separate functions. Firstly, the algorithm will determine the delay difference between the two signals, and secondly it will determine any Doppler shift due to motion of the target.

To determine the time delay the algorithm performs a cross correlation of the signal from the first antenna with the signal from the second antenna. The Doppler effect is then used to determine the speed of the target. To do this the results from successive cross correlations are stored, and the change in relative phase between the signal from antenna 1 and antenna 2 at the delay (or delays) of interest is calculated by means of a DFT (Discrete Fourier Transform) or FFT (Fast Fourier Transform), or similar algorithm. The "delays of interest" may include all possible delays calculated by the cross correlation.

What is claimed is:

1. A passive method of detecting an object, the method comprising receiving at a receiver a first signal transmitted by a mobile phone base station, receiving at the receiver a second signal comprising the first signal transmitted by a mobile phone base station after it has been reflected off an object; and comparing the first and second signals to derive data relating to position or speed of movement of the object; the method further comprising providing a plurality of mobile phone base stations which transmit a signal, such that as the object moves out of range of one base station, it comes into range for another, whereby the distance of the object from a base station being used to determine a position of the object remains substantially constant and distance of the object from the receiver changes, thereby improving the received power and range.

2. A method according to claim 1, the method further comprising a time delay between receiving the first and second signals, by performing a cross correlation of the signal from the first antenna with the signal from the second antenna; determining the speed of the target using the Doppler effect; storing results from successive cross correlations, and calculating the change in relative phase between the signal from the first antenna and the second antenna at the delay of interest.

3. A method according to claim 2, wherein the change in relative phase is calculated by means of a Discrete Fourier Transform (DFT) or Fast Fourier Transform (FFT).

4. A passive detection system, the system comprising a receiver having first and second antennas; and processing means; wherein the first antenna is adapted to receive a signal transmitted by a mobile telephone base station; wherein the second antenna is adapted to receive the signal transmitted by the mobile telephone base station after the signal has been reflected off an object and wherein the processing means compares the signal received from the mobile telephone base station with the signal reflected from the object and derives speed or position information relating to the object therefrom; wherein the object is a moving object; and the system further comprises a plurality of mobile phone base stations which transmit a signal, such that as the object moves out of range of one base station, it comes into range for another, whereby the distance of the object from a base station being used to determine a position of the object remains substantially constant and distance of the object from the receiver changes, thereby improving the received power and range.

* * * * *